3,595,831
TRIPHENYLTIN NONYLPHENOXIDE AS A
MICROBICIDE
Wilbur S. Taylor, Norwalk, Conn., assignor to R. T.
Vanderbilt Company, Inc., New York, N.Y.
No Drawing. Filed July 10, 1968, Ser. No. 743,598
Int. Cl. C08f 45/64
U.S. Cl. 260—45.75K                                  3 Claims

ABSTRACT OF THE DISCLOSURE

Triphenyltin nonylphenoxide, which is produced by reaction of nonylphenol with triphenyltin hydroxide or bis-(triphenyltin) oxide, is useful as a bactericide and fungicide. It is especially useful as an additive to vinyl formulations and in agricultural uses in foliar applications.

---

This invention is related to a novel organotin compound having bactericidal and fungicidal activity. More particularly, this invention concerns triphenyltin nonylphenoxide and its use as a fungicide or bactericide.

Organotin compounds are known to have fungicidal and bactericidal activity, but frequently have other properties which make them unsuitable for particular applications. For example, it has been proposed to employ organotin compounds as preservatives for vinyl resin formulations, but because most such compounds are solids, they are not easily dispersed throughout the formulation. In addition, many organotin compounds cannot be employed for agricultural applications because of their phytotoxicity. Again, although organotin compounds have been recommended as additives to soap and detergent formulations, such as hand soaps, shampoos and the like, they ordinarily have been found unsuitable either because they are inactive in such formulations or they lack sufficient substantivity to skin to be of practical value. Finally, organotin compounds are relatively expensive, primarily because of the tin content, and many organotin compounds which might otherwise be suitable for a particular utility are ruled out because of their excessive cost.

It has been discovered in accordance with the present invention that triphenyltin nonylphenoxide is a particularly useful organotin compound. It is an excellent bactericide and fungicide, and, based upon tin content, is superior to many organotin compounds. In addition, it is liquid at the temperatures at which vinyl formulations are mixed and thus is readily incorporated into such formulations; it is not phytotoxic, and thus can be employed in agricultural formulations, and in soap and detergent formulations it retains its activity and is skin-substantive.

The triphenyltin nonylphenoxide of the present invention is represented by the formula:

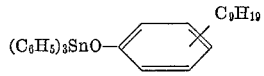

The nonyl group can be linear or branched, and can be in the ortho-, meta- or para-position. The nonylphenyl group is derived from nonylphenol, preferably commercial nonylphenol, which is a mixture of all three position isomers, with the para-isomer predominating, of phenol alkylated with tripropylene.

The preferred form of the triphenyltin nonylphenoxide, i.e., that derived from commercial nonylphenol, is a viscous, high-boiling material having a refractive index, $n_D^{25}$, of 1.5708. Its infrared absorption spectrum is characterized by strong absorption peaks at 3.4µ, 6.664µ, 8.0µ, 13.73µ, and 14.3µ, moderate absorption peaks at 6.23µ, 6.83µ, 6.97µ, 7.25µ, 8.48µ, 9.29µ and 12.02µ, and weak absorption peaks at 9.76µ and 10.02µ.

The triphenyltin phenoxide is readily prepared by reaction of either triphenyltin hydroxide or bis(triphenyltin) oxide with nonylphenol at elevated temperatures, e.g., 150–200° F. The reaction is desirably conducted under conditions under which the water of reaction is removed; above the temperatures mentioned, use of vacuum is desirable. Under these conditions the yield of triphenyltin nonylphenoxide is essentially quantitative.

The ratio of nonylphenol to triphenyltin reactant is not critical, although at least a stoichiometric amount of nonylphenol is preferred for economic reasons. A stoichiometric excess of nonylphenol is desirable in some cases.

Although triphenyltin nonylphenoxide is of wide utility as a bactericide and fungicide, it is particularly useful as an additive to vinyl formulations and as an agricultural fungicide. In addition, it is useful as an additive to soap and detergent formulations.

In agricultural uses and as a soap or detergent additive, triphenyltin nonylphenoxide is desirably employed in a relatively pure form. As an additive for vinyl formulations, however, it is preferably employed in a diluted form, such as in a 20–25% solution in nonylphenol. In such a case the reaction is carried out by employing excess nonylphenol, for example 9 to 10 gram moles of nonylphenol per gram atom of tin in the triphenyltin compound (oxide or hydroxide) and using the resulting reaction mixture as the additive. The effective amount of triphenyltin nonylphenoxide in vinyl formulations is ordinarily at least about 0.1 part per hundred parts of poly(vinyl chloride). The maximum amount is not critical, although amounts in excess of about 0.5 part per hundred are usually unnecessary. The optimum amount is generally in the range of from about 0.1 to about 0.2 part per hundred.

When employed as an agricultural fungicide, triphenyltin nonylphenoxide is normally employed in admixture with an inert carrier, and preferably as an aqueous dispersion. The rate of application will depend upon the crop to be protected and the particular pest to be controlled, but ordinarily will be in the range of from about 3 to 10 ounces per acre.

The following examples are illustrative. In the examples all parts are by weight.

EXAMPLE I

To 208 parts of nonylphenol was gradually added 36.7 parts of triphenyltin hydroxide, with stirring, to form a pasty suspension. Vacuum was applied gradually to avoid foaming to a pressure of about 75–150 mm. Hg and the stirred reaction mixture was heated to about 140–167° F. The mixture was maintained under these conditions for about 1.5 hours, during which period about 1.6 pounds of water was recovered. The reaction temperature was then raised to about 230 to 239° F., the vacuum released, and 0.25 part of "Super Cel" (a filter aid marketed by Johns-Manville) was added. After stirring for 5 minutes the resulting mixture was filtered to yield 242.9 parts of a solution of 56.9 parts of triphenyltin nonylphenoxide in nonylphenol.

EXAMPLE II

When the procedure of Example I is repeated, except that equimolar amounts of nonylphenol and triphenyltin hydroxide are employed, substantially pure triphenyltin nonylphenoxide is obtained.

EXAMPLE III

Mixtures of 100 parts poly(vinyl chloride) (Diamond PVC 500), 40 parts dioctyl phthalate, 7 parts epoxidized soybean oil plasticizer ("G–62" marketed by Rohm and Haas), 0.5 part of stearic acid and 3 parts of a barium-cadmium-zinc stabilizer ("Vanstay 162B" marketed by R. T. Vanderbilt Company, Inc.) and varying amounts of a triphenyltin nonylphenoxide-nonylphenol solution produced in a manner similar to that described in Example I were fluxed for 4 minutes on a 320° F. mill and then sheeted off. Discs 1⅞ inches in diameter and slabs of 1¼ by 2¼ inches were died out of these sheets and tested for biological activity and heat stability.

The discs were placed on nutrient agar plates seeded with *Bacillus subtilis*, *Streptococcus aureus* or *Salmonella typhosa* and observed after 24 hours incubation at 98° F. for evidence of inhibition of bacterial growth, which was measured by the zone of inhibition method. Other discs were placed on mineral salt agar plates inoculated with a mixed spore suspension and observed after 7 and 14 days' incubation at 79° F. for evidence of fungal growth and for bloom.

Nine slabs of each formulation were placed in a circulating air oven at 375° F. and one sample was removed every ten minutes to evaluate discoloration.

The results of these tests are summarized in Table A, and compared with the results obtained from a control sample containing no triphenyltin nonylphenoxide.

TABLE A.—BIOCIDAL ACTIVITY AND HEAT STABILITY OF VINYL FORMULATIONS CONTAINING TRIPHENYLTIN NONYLPHENOXIDE

| | Sample | | | |
|---|---|---|---|---|
| | Control | A | B | C |
| Additive: Triphenyltin nonylphenoxide nonylphenol solution, phr | 0 | 0.5 | 0.75 | 1.0 |
| Triphenyltin nonylphenoxide, per se | 0 | 0.075 | 0.1125 | 0.15 |
| Fungal growth:[1] | | | | |
| 7 days | ++ | 0 | 0 | 0 |
| 14 days | +++ | 0 | 0 | 0 |
| Zone of inhibition, mm.:[2] | | | | |
| *B. subtilis* | 0 | 0 | 1 | 1 |
| *S. aureus* | 0 | 0 | Tr. | 2 |
| *S. typhosa* | 0 | 0 | 1 | 1 |
| Color[3] after exposure at 375° F. for: | | | | |
| 10 minutes | 0.5 | 0.5 | 0.5 | 0.5 |
| 20 minutes | 1 | 1 | 1 | 1 |
| 30 minutes | 1.5 | 1.5 | 1.5 | 1.5 |
| 40 minutes | 2 | 2 | 2 | 2 |
| 50 minutes | 2.5 | 2.5 | 2.5 | 2.5 |
| 60 minutes | 3 | 3 | 3 | 3.5 |
| 70 minutes | 4.5 | 4 | 4 | 5 |
| 80 minutes | 5.5 | 5 | 5 | 7 |
| 90 minutes | 6.5 | 5.5 | 6 | 7.5 |

[1] Scale of 0 for no fungal growth to +++ for very heavy growth.
[2] Average diameter of zone of no bacterial growth around the disc.
[3] Scale of 0 for no discoloration to 8 for a deep yellow color.

The foregoing data establish that triphenyltin nonylphenoxide-nonylphenol solution effectively controls the growth of fungi and bacteria without significant adverse effect on the stability of the vinyl formulation when used at a rate of 1 part per hundred of poly(vinyl chloride) (about 0.15 part per hundred of triphenyltin nonylphenoxide per se).

EXAMPLE IV

Triphenyltin nonylphenoxide prepared in a manner similar to that described in Example II was dispersed in water at a rate of 3 ounces per 100 gallons. The resulting formulation was sprayed onto field grown potatoes, using a 6-nozzle spray boom for each row, at 200 p.s.i. at a rate of 150 gallons per acre as protection against late blight. Eleven applications were made on days 1, 7, 12, 19, 23, 28, 34, 39, 42, 46 and 51. The plants were examined on days 46, 49, 53, 57, 60 and 65 and examined visually for degree of defoliation and evidence of phytotoxicity. The tubers were harvested on the 65th day and weighed. The results of these tests are summarized in Table B, together with the results from an untreated control plot.

TABLE B.—TREATMENT OF FIELD GROWN POTATOES WITH TRIPHENYLTIN NONYLPHENOXIDE

| | Defoliation, percent | |
|---|---|---|
| | Treated | Untreated (control) |
| Day from first treatment: | | |
| 46 | 0 | 5.5 |
| 49 | 0.5 | 22.5 |
| 53 | 2 | 70 |
| 57 | 5 | 80 |
| 60 | 17.5 | 92.5 |
| 65 | 40 | 97.5 |
| Yield after 65 days, lbs | 126 | 99 |

The data set forth in Table B indicate that triphenyltin nonylphenoxide provided excellent protection as long as the plants were being sprayed. Although defoliation increased between the 53rd and 57th days (two and six days, respectively, after the last application), the yield was significantly better than that of the untreated control. No phytotoxicity due to triphenyltin nonylphenoxide was observed.

In a similar test, in which triphenyltin hydroxide was substituted for triphenyltin nonylphenoxide as the fungicide, defoliation occurred due to phytotoxicity and the tuber yield was only 108 pounds.

What is claimed is:

1. In a vinyl chloride resin formulation, the improvement of including in said formulation triphenyltin nonylphenoxide in an amount effective to inhibt bacterial and fungal growth.

2. A formulation according to claim 1 wherein said triphenyltin nonylphenoxide is dissolved in nonylphenol.

3. A formulation according to claim 2 wherein said solution comprises a 20 to 25 percent solution of triphenyltin nonylphenoxide in nonylphenol.

References Cited

UNITED STATES PATENTS

| 2,745,820 | 5/1956 | Mack | 260—45.75 |
| 3,214,453 | 10/1965 | Stern | 260—429.7 |

FOREIGN PATENTS

| 734,119 | 7/1965 | Great Britain | 424—288 |

DONALD E. CZAJA, Primary Examiner

V. P. HOKE, Assistant Examiner

U.S. Cl. X.R.

260—429.7R; 424—288R

FO-1050
(5/69)

UNITED STATES PATENT OFFICE
CERTIFICATE OF CORRECTION

Patent No. 3,595,831      Dated July 27, 1971

Inventor(s) Wilbur S. Taylor

It is certified that error appears in the above-identified patent and that said Letters Patent are hereby corrected as shown below:

Col.1, line 69, "6.664 µ" should read --6.64 µ--.

Signed and sealed this 7th day of March 1972.

(SEAL)
Attest:

EDWARD M. FLETCHER, JR.      ROBERT GOTTSCHALK
Attesting Officer            Commissioner of Patents